INVENTOR.
JOHN A. JOHNSON
BY John A. Seifert
Attorney

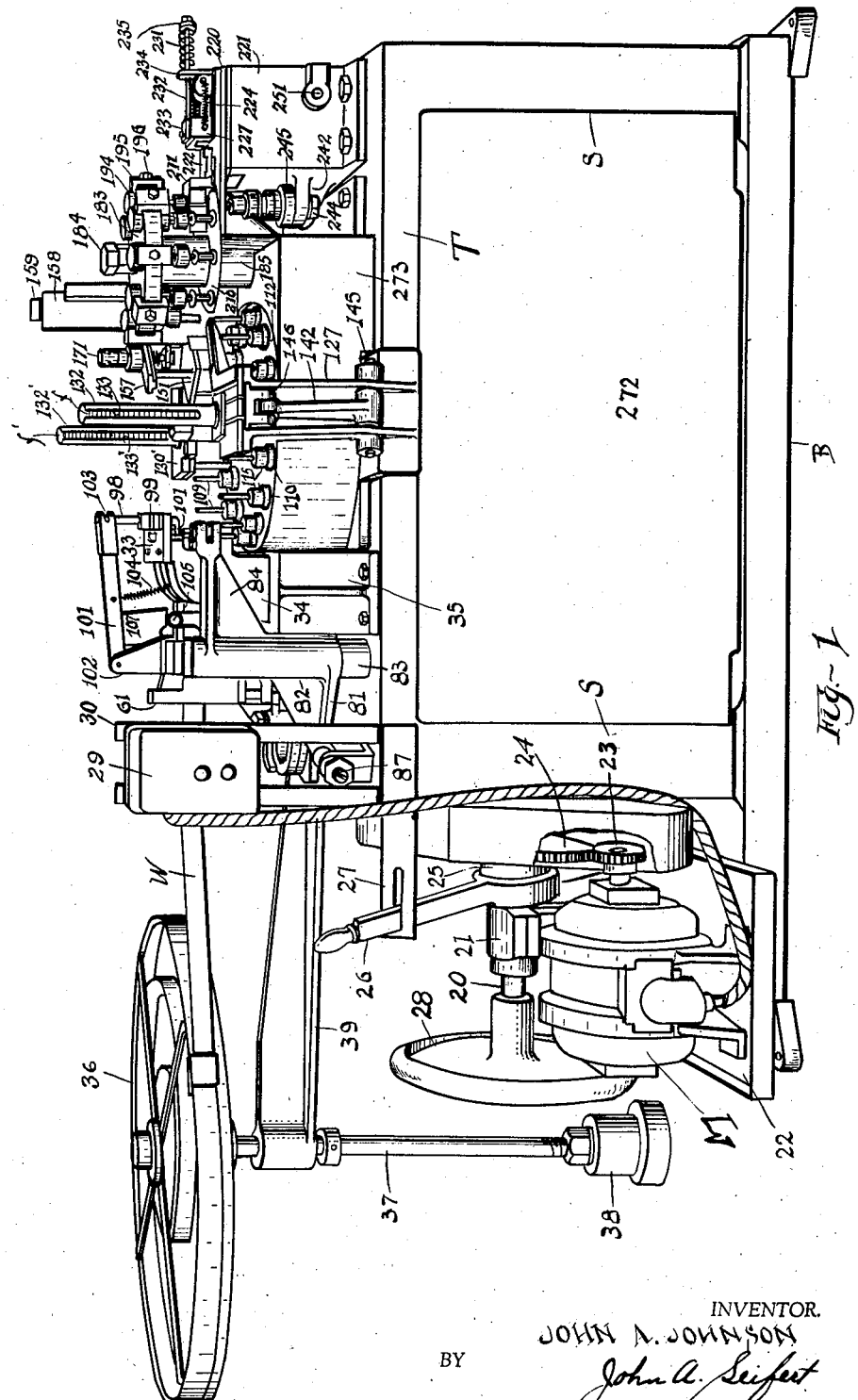

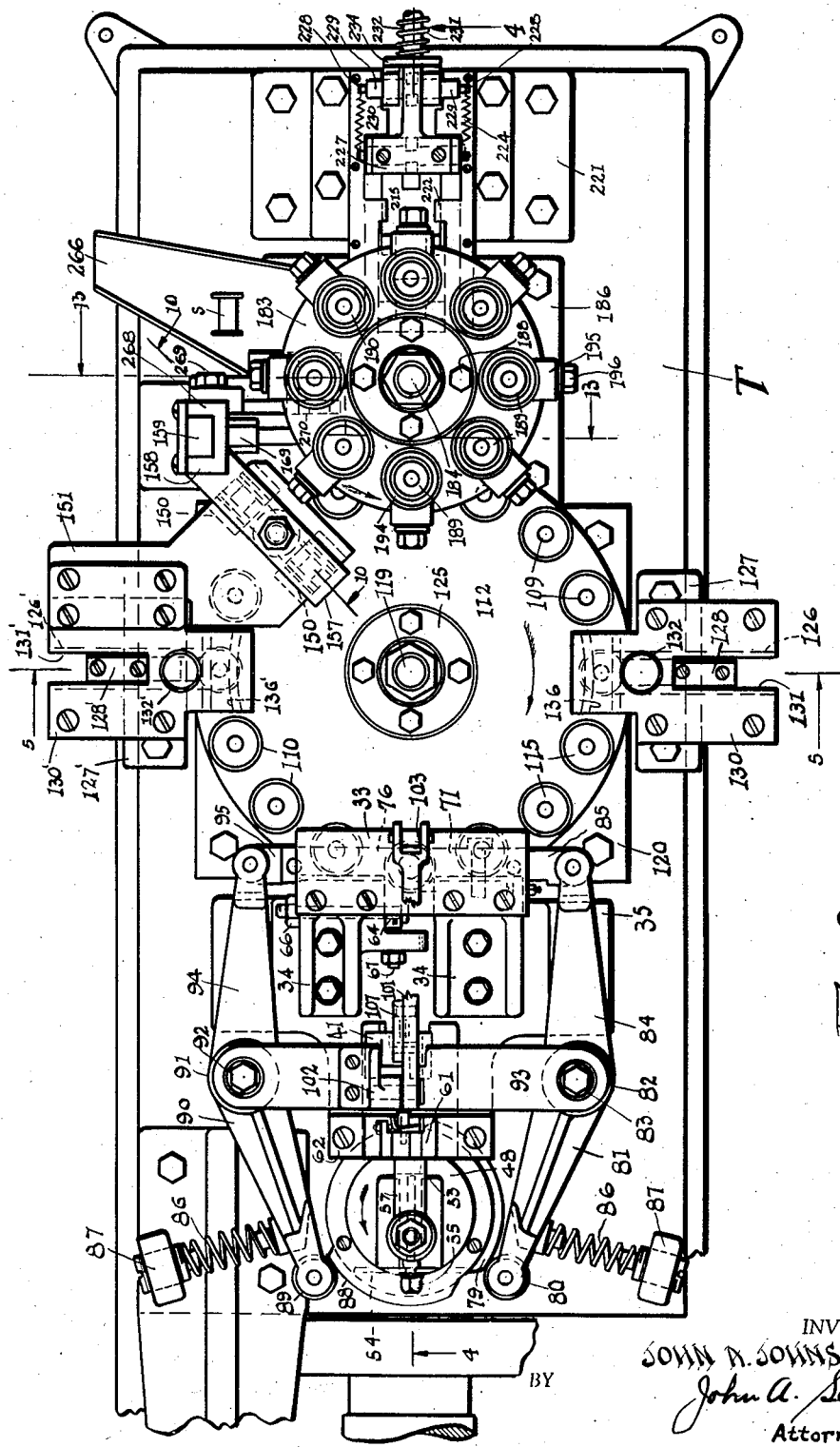

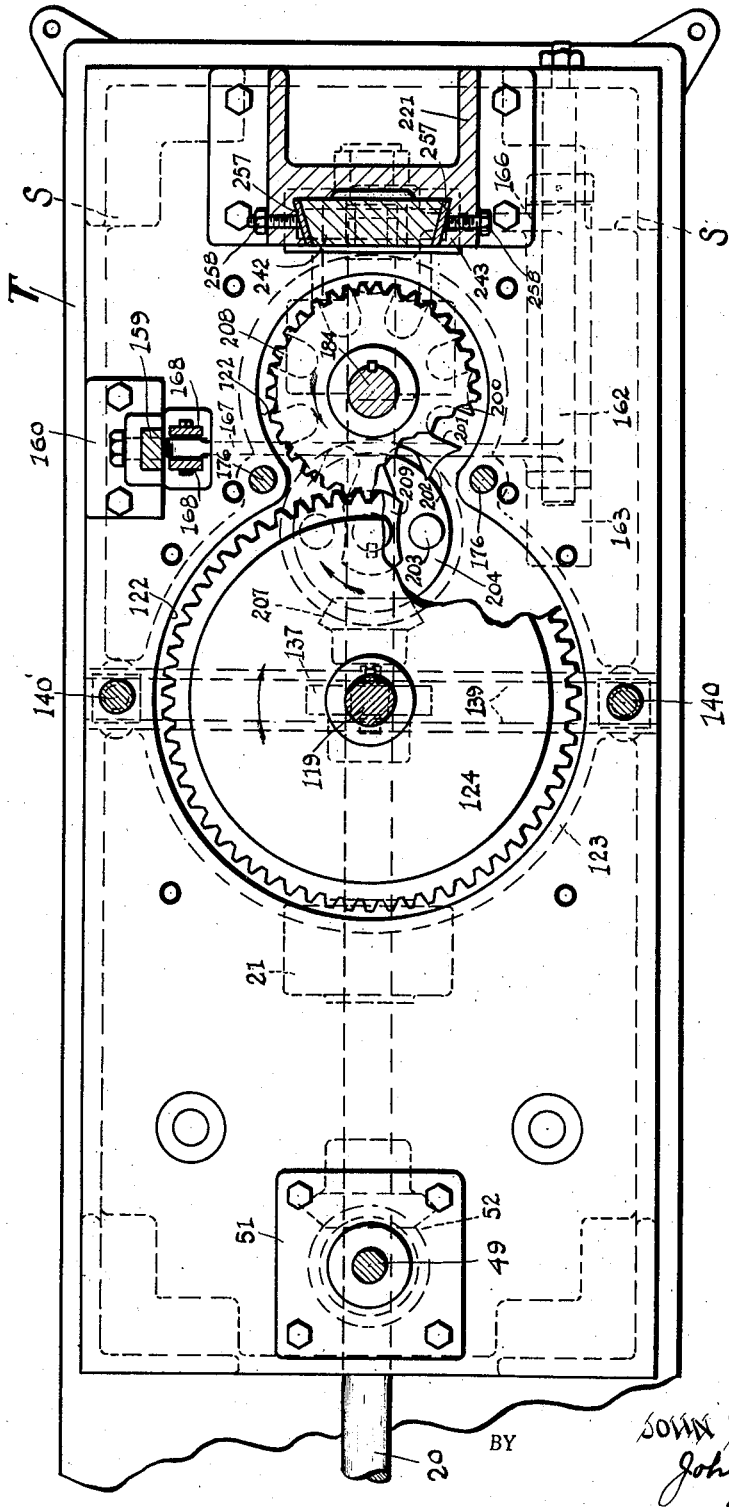

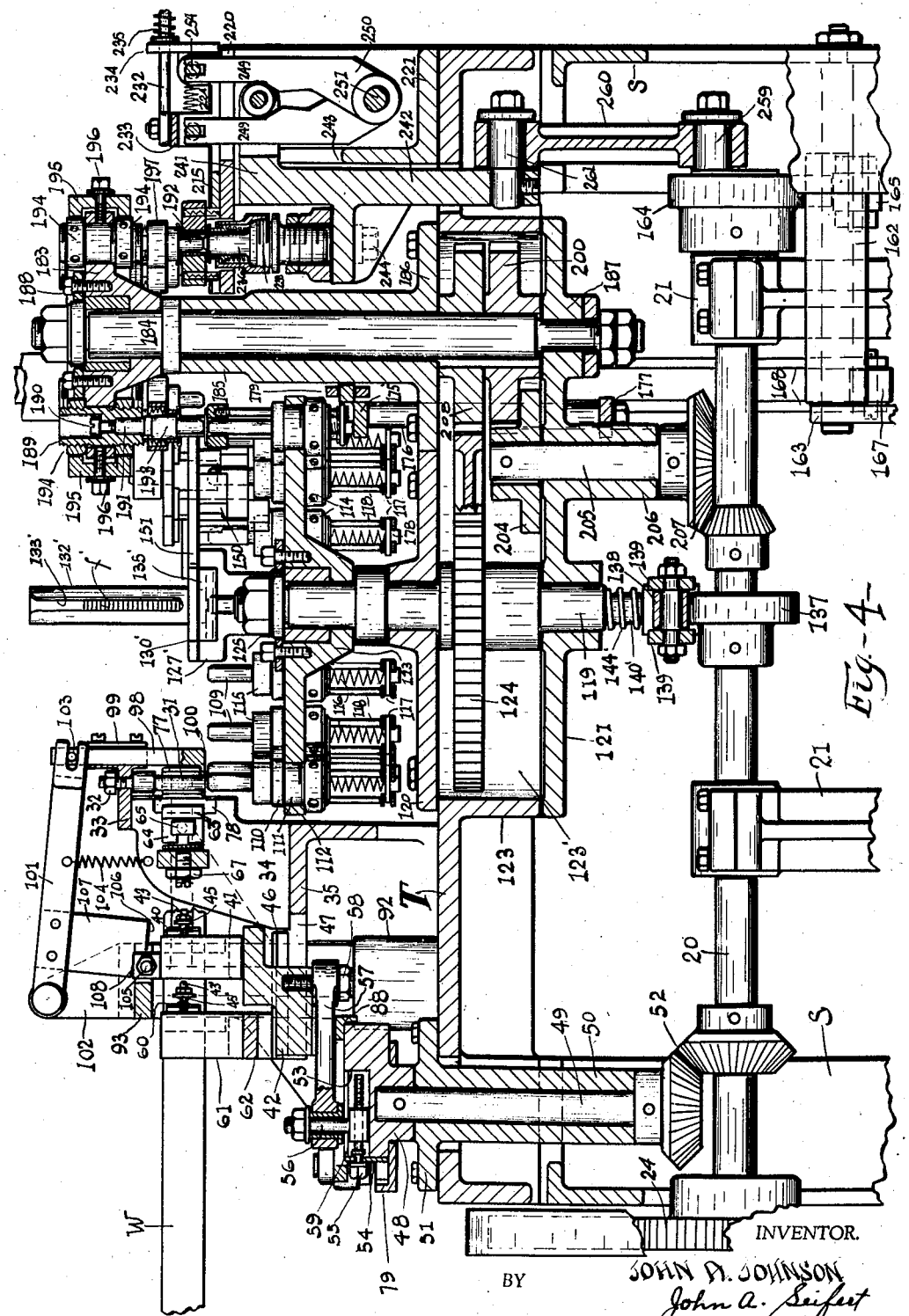

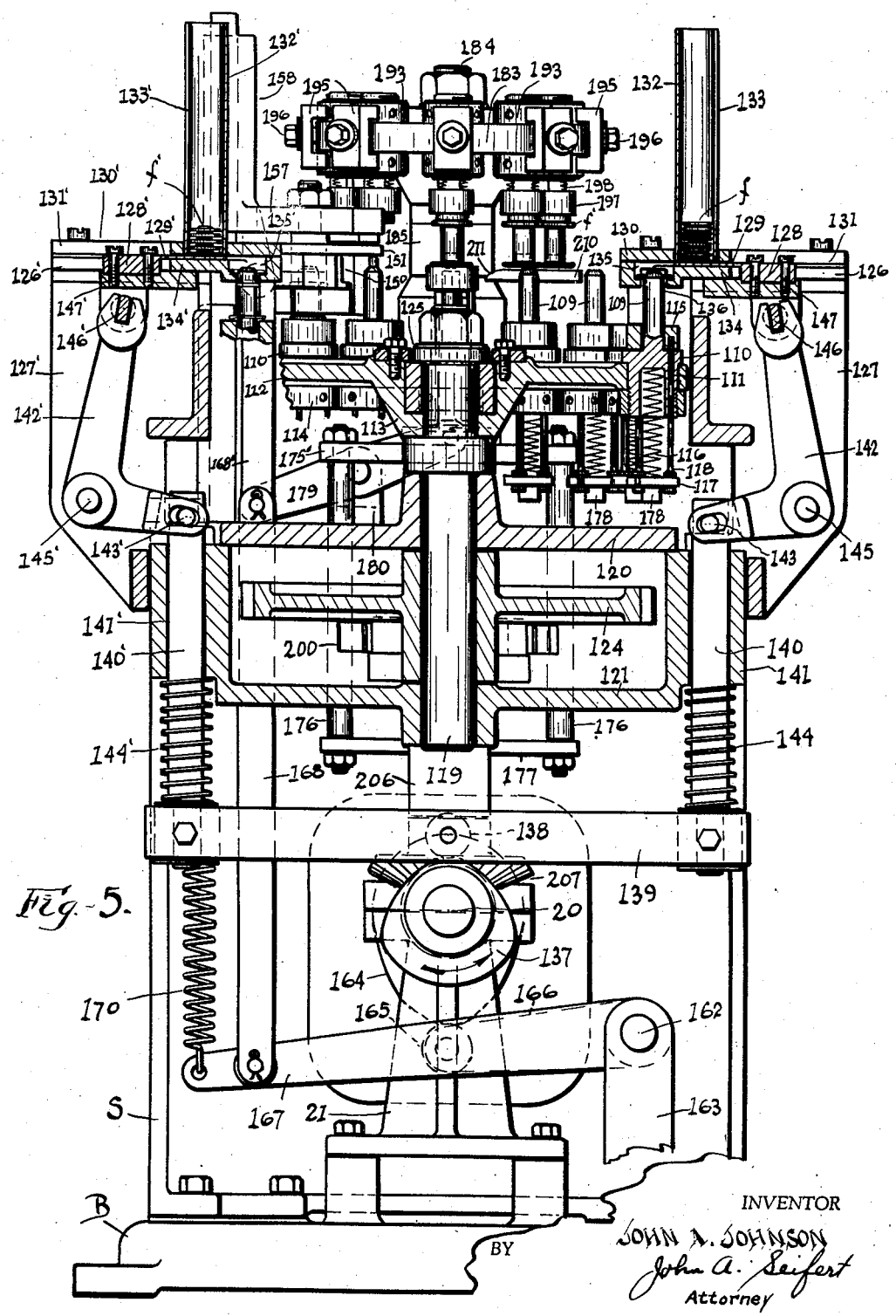

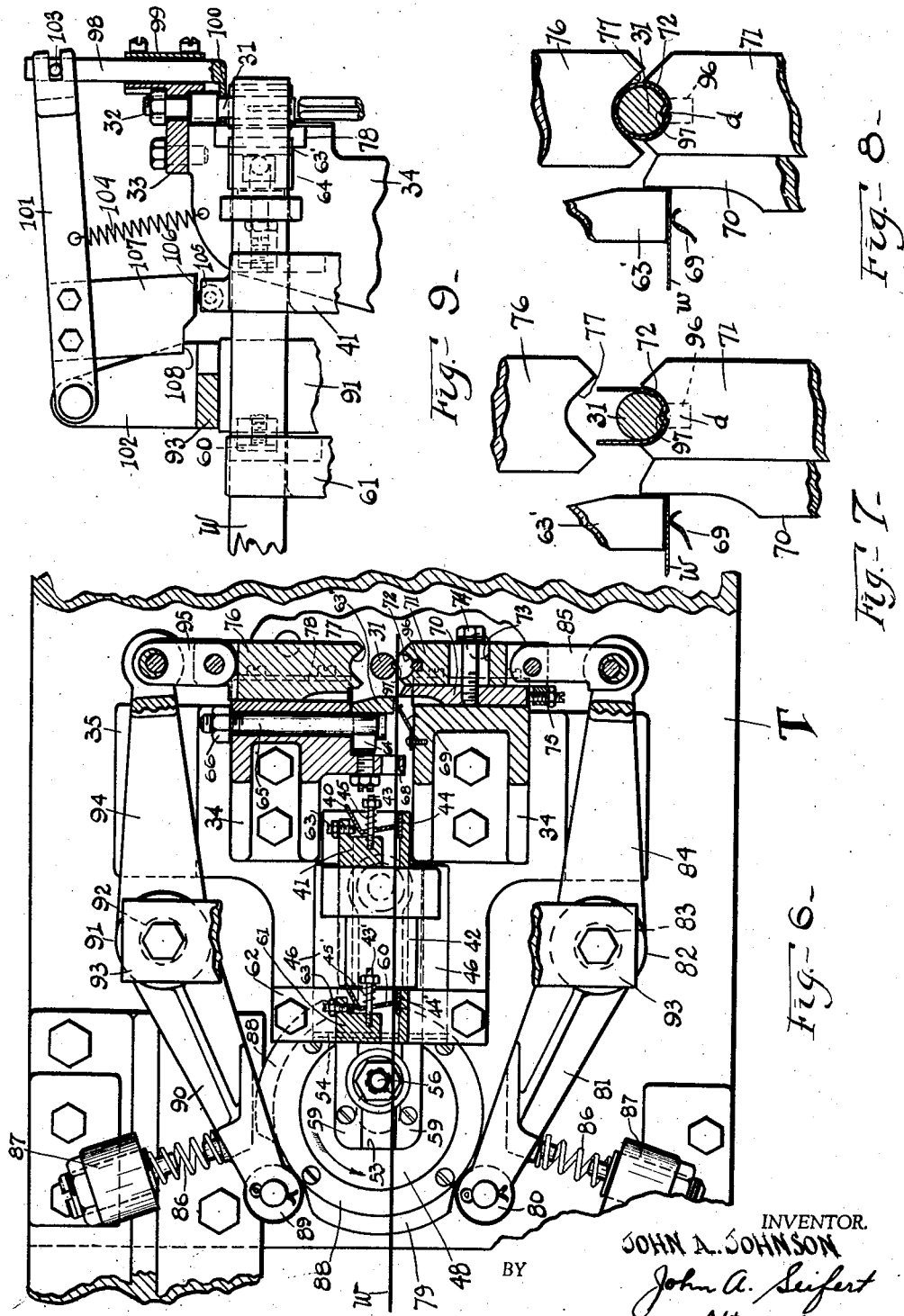

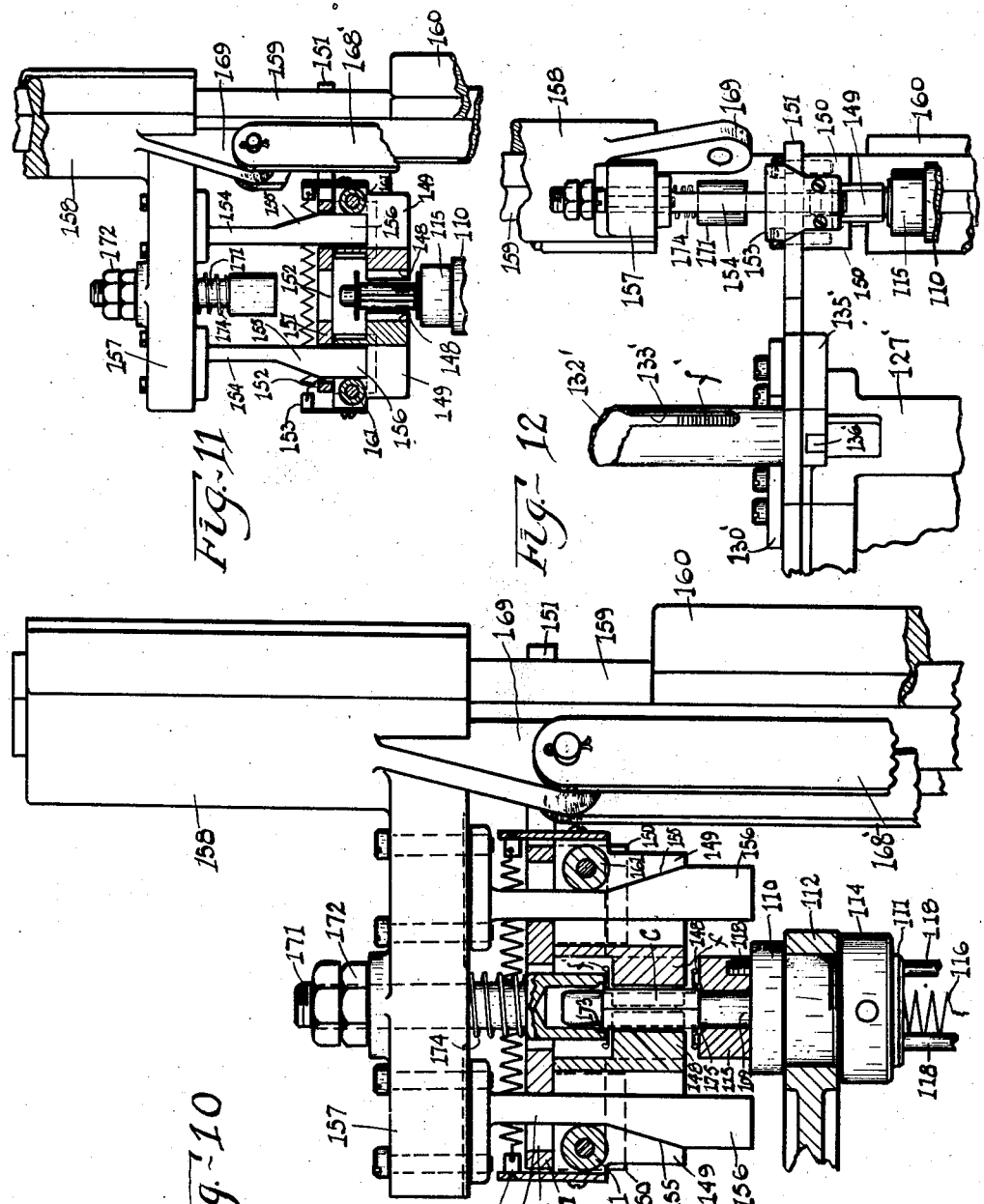

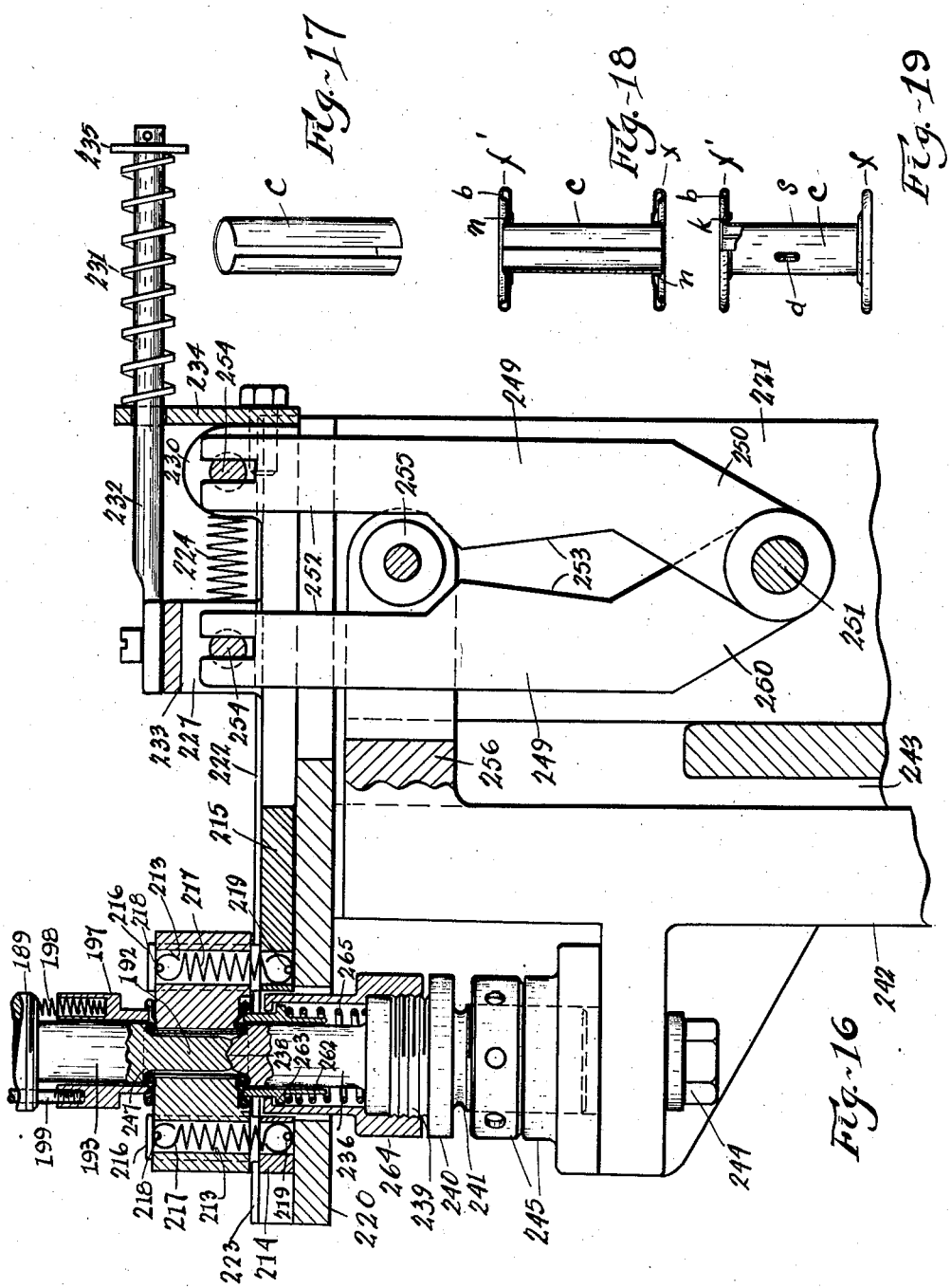

Patented Dec. 19, 1944

2,365,274

UNITED STATES PATENT OFFICE 2,365,274

SPOOL MAKING APPARATUS

John A. Johnson, Woodhaven, N. Y.

Application June 13, 1940, Serial No. 340,248

17 Claims. (Cl. 113—1)

This invention relates to apparatus for making spools of sheet metal comprising a tubular core and annular flanges secured to the opposite ends of the core and particularly used for carrying a strand or web of material, such as medicated tape, wound upon the core.

It has been the common practice heretofore, as shown in my patents, No. 2,169,251 patented August 15, 1939, for Spool making apparatus and No. 2,196,262 patented April 9, 1940, for Apparatus for forming metal bodies, to form the cores in one apparatus and transfer the formed cores from said apparatus to another apparatus in which the annular flanges are engaged on and secured to the opposite ends of the core and a web anchoring depression is formed in the core.

It is the principal object of the present invention to provide a single apparatus to form the core with a web anchoring depression, and engage and secure the annular flanges to the opposite ends of the core.

It has also been the common practice, as shown in my aforementioned Patent No. 2,196,262, to form the cores from a previously formed blank, and it is another object of the invention to form the cores from a web of sheet metal.

It is a further object of the invention to form the web anchoring depression in the core simultaneously with the forming of said core.

It is a still further object of the invention to provide a series of horns of novel construction upon which horns the flanges are assembled on the opposite ends of the core embodying means to remove the assembled flanges and core from said horns.

Another object of the invention is to provide novel means for delivering annular flanges to the series of horns in a horizontal position and placing the flanges in said position on the horns by the force of gravity and without the use of a reciprocating plunger.

A further object of the invention is to provide novel means to crimp the opposite ends of the core to the flanges after the core and flanges have been assembled and removed from the series of horns of the assembling means including a pair of jaws adapted to embrace the core and permit longitudinal movement of the core during the crimping operation and arranged to cooperate with a series of horns and a reciprocating die member of said crimping means to crimp the opposite ends of the core to the flanges.

A further object of the invention is to provide novel means to reciprocally mount the jaws of the crimping means to permit actuation of said jaws at one side of said jaws.

Other objects and advantages of the invention will be set forth in the detail description of the embodiment of the invention.

The embodiment of the invention comprises an apparatus including means to form a core from a web of sheet metal, means to receive a formed core and assemble annular flanges on the opposite ends of the core, and means to crimp the opposite ends of the core to the flanges and deliver a completed spool from the apparatus. The means to form a core comprises a reciprocating dog adapted to feed a predetermined length of web from a reel to a mandrel and a fixed cutter to sever a blank from the web and fold the blank around the mandrel by a second cutter carried by a forming member of a pair of forming members reciprocating toward and away from diametrically opposite portions of the mandrel in a plane transversely of the web feed, the forming member carrying the second cutter being actuated in advance of the other forming member to move the second cutter relative to the fixed cutter and sever the predetermined length from the web and wrap the center section of the severed portion of web or blank around half of the mandrel and the subsequent movement of the other forming member engaging and folding or wrapping the opposite end sections of the severed portion around the remaining half of the mandrel to form a tubular contractile and expansible core having the opposite longitudinal edges disposed in separated and opposed relation. The forming member carrying the second cutter is arranged with an indenting member adapted to cooperate with a corresponding recess in the mandrel and form a depression in an intermediate portion of the spool core during the wrapping of the center section of the severed portion of the web around the mandrel. A dog is mounted in fixed relation to the feed of the web between the reel and the feeding dog and arranged to engage and prevent movement of the web during the retrograde movement of the feeding dog. After the core is formed, the forming members and web feeding dog are actuated from the mandrel and a stripping member is yieldingly urged to transfer the core from the mandrel to a horn of a series of horns intermittently positioned in vertical alinement below the mandrel by a rotatable turret constituting a part of the means to assemble annular flanges on the opposite ends of the core. Each horn is arranged with an encircling annular member slidably supported in the turret and yieldingly urged to the lower end of the horn to support an annular flange positioned on the horn by means at a station of the horn preceding the station at which the horn is presented to the core forming means, so that a core transferred from the core forming mandrel to a horn will be positioned on the horn with the lower end engaging an annular flange previously positioned on said horn. The horns having a flange on the annular member and a core engaging said flange are presented to means to position a second annular flange on said horns in engagement with the upper end of the cores on said horns and said flange positioning means is the same as the means to position the first flanges on the horns and comprises a horizontal slideway having a pocket above the horns arranged with an opening for the passage of the horns through said pocket. The annular flanges are delivered to the slideway by the force of gravity from a supply tube and are fed by a reciprocating slide from said tube to the pocket and onto a horn positioned in said pocket. The horns having thereon a core with flanges at the opposite ends are presented to a pair of members slidably mounted and yieldingly urged to engage arcuate faces of said members with diametrically opposite portions of the core and contract the core upon the horn to permit movement of the annular flanges longitudinally onto the core, and a reciprocating plunger having a hollow head adapted to engage and move the second flange upon the core and move the core into the first flange on the annular member by the movement of the plunger toward the horn while the pair of members are maintaining the core in contracted condition. The retrograde movement of the plunger from the horn actuates the pair of members out of engagement with the core to permit the core to expand and retain the flanges in their assembled position thereon by a pair of cam faces movable with the plunger and engaging rollers carried by the pair of members. After the flanges are assembled on the opposite ends of the core, the successive horns are positioned relative to the means for crimping the opposite ends of the core to the flanges comprising a second intermittently actuated turret rotatable in a plane above the plane of rotation of the turret of the flange assembling means and having a series of horns having an annular recess intermediate the ends and stripping means yieldingly positioned at said recess. The assembled flanges and core are transferred from a horn of the first series of horns to an alined horn of the second series of horns by the annular members of the first horns being actuated to a position above the first horn by a head reciprocated toward and away from the underface of the first turret and the transferring movement of the annular members being sufficient to fully engage the upper end of the core into the annular recess of the second horns. The second turret is intermittently actuated to move the horns thereof having assembled flanges and cores thereon from the first turret and present said horns relative to a pair of jaws yieldingly urged toward each other to clamp diametrically opposite portions of the core and having annular recesses in the top and bottom to cooperate with the annular recess in the second horns and an annular recess in a die member reciprocatory toward and away from the lower end of the core on said second horns to crimp the ends of the core to the flanges assembled thereon. The die member is operatively connected to the jaws by a roller carried by the die member engaging cam faces on arms connected to the jaws, whereby the movement of the die member toward and away from the second horn will actuate the jaws from the core on said horn and the approach of the die member to the lower end of the core will permit the jaws to clamp the core and effect the crimping of the ends of the core to the flanges. After the crimping operation, the second horn is moved from the die member and jaws and the completed spool will drop from said horn onto a chute leading to a suitable depository.

In the drawings accompanying and forming a part of this application,

Figure 1 is an isometric view of the apparatus constituting the embodiment of the invention and including a reel for a supply of the sheet metal web from which the cores are formed.

Figure 2 is a top plan view of the apparatus.

Figure 3 is a view similar to Figure 2 with the operative parts removed to show the driving connections of said parts with a drive shaft.

Figure 4 is a longitudinal sectional view of the apparatus taken on the line 4—4 of Figure 2 looking in the direction of the arrows to show the stripping member transferring a core from the core forming mandrel to a horn of the first series of horns, the annular member transferring an assembled core and flanges from a horn of the first series of horns to a horn of the second series of horns, and the die member cooperating with a horn of the second series of horns to crimp the ends of the core to the flanges.

Figure 5 is a cross sectional view of the apparatus taken on the line 5—5 of Figure 2 looking in the direction of the arrows to show the slides feeding flanges from the supply tubes to diametrically opposed horns of the first series of horns positioned in the pockets of the slideways.

Figure 6 is a fragmentary plan view of the core forming means showing in section the reciprocating dog feeding a predetermined length of web to the mandrel, the cutters and the forming members of said means.

Figure 7 is a fragmentary plan view, on an enlarged scale, of the core forming members showing the member carrying the second cutter wrapping the center section of the severed portion of the web around half of the mandrel shown in section and forming the web anchoring depression.

Figure 8 is a view similar to Figure 7 showing the other core forming member wrapping the end sections of the severed portion of the web around the remaining half of the mandrel.

Figure 9 is a fragmentary elevational view partly in section of the core forming means showing the stripping member of said means actuated to inoperative position by the feeding movement of the web feeding dog.

Figure 10 is a fragmentary view, on an enlarged scale, of the means for moving the flanges onto the end portions of the core shown in section taken substantially on the line 10—10 of Figure 2 looking in the direction of the arrows to show the pair of slidable members engaging the core and the plunger moving the flanges onto the core.

Figure 11 is a view similar to Figure 10, on a smaller scale, showing the plunger positioned from the second flange and the slidable members actuated by the plunger out of engagement with the core.

Figure 12 is a view of the means for moving the flanges onto the core looking at the right hand side of Figure 11 and also showing the supply tube for the second annular flanges.

Figure 13:
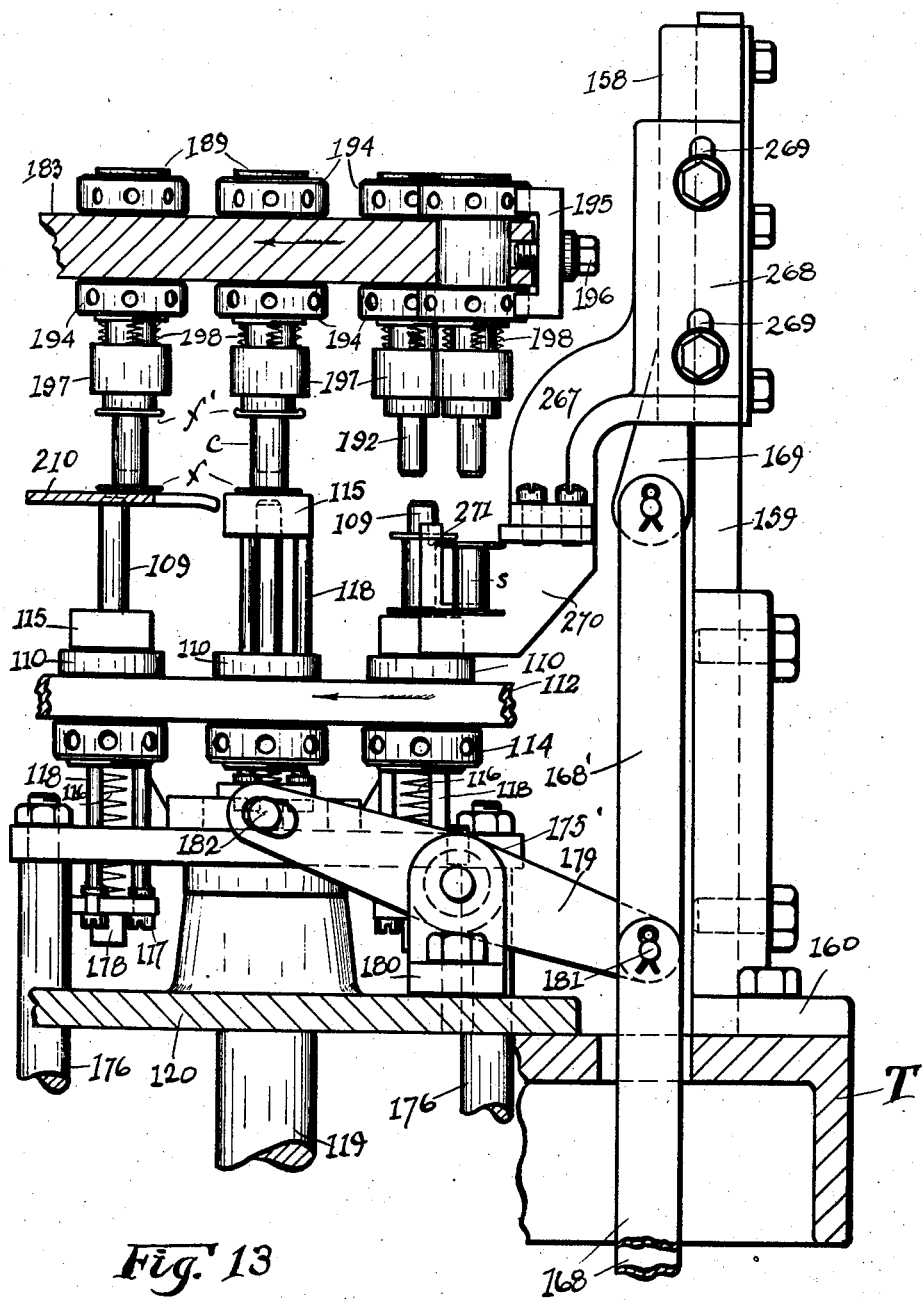

Figure 13 is a fragmentary view taken substantially on the line 13—13 of Figure 2 looking in the direction of the arrows with the second turret and a supporting table in section to show an annular member positioning an assembled core and flanges onto a horn of the second turret and a completed spool dropping from another horn of the second turret.

Figure 14:
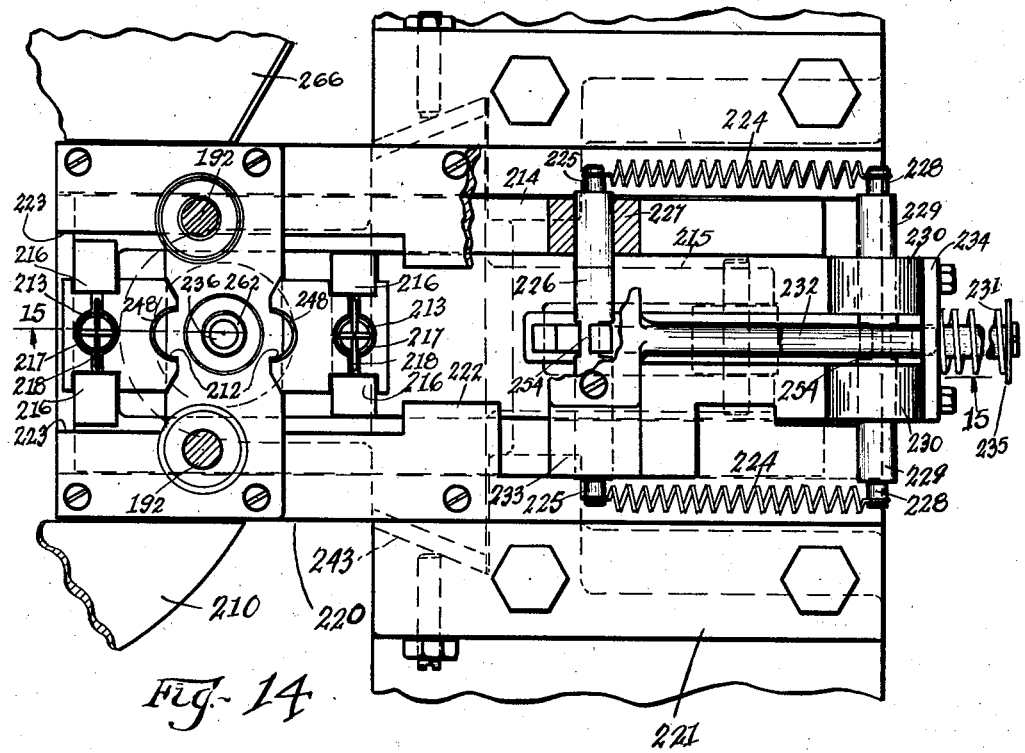

Figure 14 is a fragmentary view, on an enlarged scale, of the pair of jaws for clamping the core on a second horn during the crimping operation and their associated slides and showing the jaws in inoperative clamping position.

Figure 15:
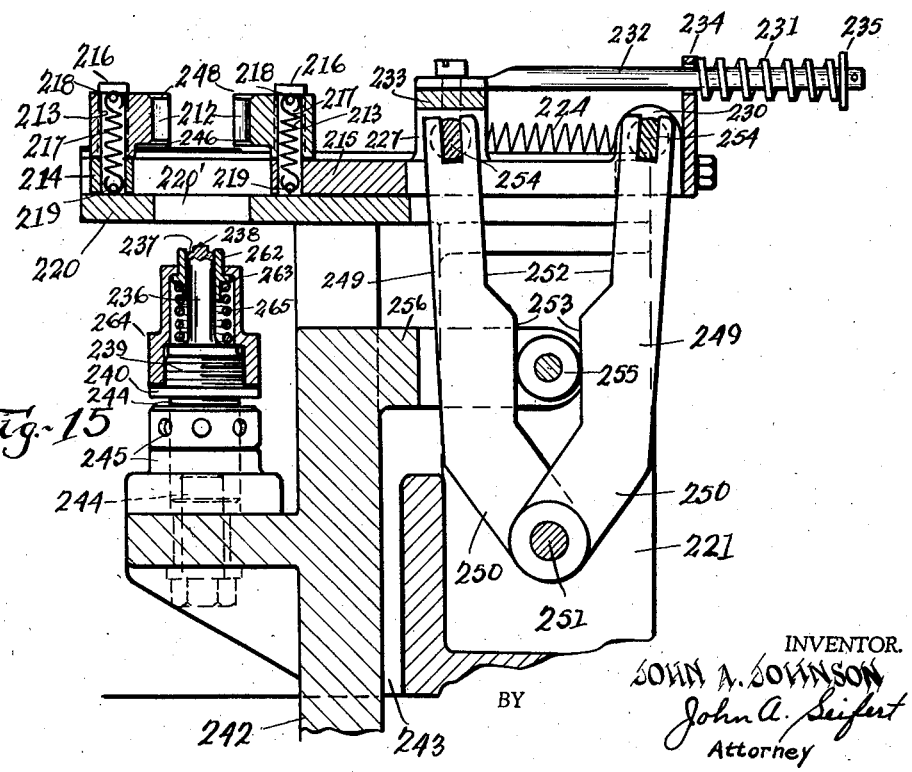

Figure 15 is a sectional view, on a reduced scale, taken on the line 15—15 of Figure 14 looking in the direction of the arrows and showing the crimping die member in inoperative position effecting the actuation of the jaws out of their normal core engaging position.

Figure 16 is a view similar to Figure 15 on a larger scale and showing the jaws and die member in position relative to a horn of the second turret to crimp the opposite ends of the core to the flanges.

Figure 17 is a perspective view of a core formed on the mandrel of the core forming means.

Figure 18 is a longitudinal section of a core and flanges engaged on the opposite ends of the core by the means shown in Figures 10 to 12, inclusive.

Figure 19 is an elevational view of a completed spool partly in section to show an end of the core crimped to a flange by the means shown in Figures 14 to 16, inclusive.

In carrying out the invention illustrated in the accompanying drawings, the operative parts are mounted on a suitable framework comprising a table T supported from a base B by standards S, and said operative parts being actuated from a drive shaft 20 rotatably supported to extend longitudinally of the framework by bearing brackets 21 mounted on the base B, as shown in Figure 5. The drive shaft 20 is adapted to be releasably connected to an electric motor M mounted on an extension of the base B by a drip pan 22 and the driven shaft of said motor having a pinion 23 meshing with a gear wheel 24 loosely mounted on the drive shaft 20 and adapted to be connected to said shaft by a conventional sliding clutch shown in a general manner at 25 and having an actuating arm 26 slidable in a plate 27 fixed to and projecting from the adjacent end of the table T, as shown in Figure 1. The drive shaft may be manually rotated to adjust the operative parts connected thereto by a hand wheel 28 fixed to an end of the drive shaft, and the motor M is controlled through a switch box 29 mounted on a bracket 30 fixed to the top of table T.

The means to form the cores of the spools is at the end of the framework supporting the electric motor M and comprises a rod shaped mandrel 31 (Figures 6, 7 and 8) having a screw threaded reduced portion at one end removably mounted to extend in a vertical plane and spaced from the table T by a nut, as shown at 32 in Figure 4, in a plate 33 fixed to and supported by a pair of standards 34 mounted on a box shaped support 35 fixed to the top of the table T. A sheet metal web W of a width slightly greater than the length of a core c of a completed spool s is intermittently fed to the mandrel 31 from a source of supply, such as a reel 36 rotatably mounted on a support 37 having a suitable base 38 and retained in spaced relation to the framework by an arm 39 fixed at the opposite ends to the support 37 and the table T, as shown in Figure 1. A predetermined length of the web W is intermittently fed to the mandrel 31 by a dog 40 of angle shape in cross section loosely mounted on a leg portion of a vertical bifurcated extension 41 of a slide 42 by a pin 43 screw threaded at one end in the leg portion and engaged in an opening in an angle portion of the dog 40 of larger diameter than the pin and the free end of said angle portion of the dog 40 is urged into engagement with a gripping plate arranged in the opposite leg portion of the vertical bifurcated extension 41 of the slide 42, as shown at 44 in Figure 6, by a spring coiled about the pin 43 and compressed between the dog 40 and a nut adjustable on the free end of the pin, as shown at 45. The slide 42 is slidable in a slideway formed by angle members 46 mounted on opposite sides of an opening 47 in the top of the support 35 and said angle members 46 adapted to engage lateral shoulders on opposite sides of the slide. The slide 42 is actuated in the slideway toward and away from the mandrel 31 by the rotation of the drive shaft 20 through crank mechanism comprising a disk 48 (Figures 2 and 4) having a hub on one face fixed on one end of a shaft 49 rotatable in an elongated sleeve 50 having a flange at one end adapted to engage and be fixed to the portion of the table T around an opening in said table, as shown at 51 in Figures 3 and 4, and suspend the sleeve from the table. The shaft 49 is rotatably supported in the sleeve 50 by the hub of the disk 48 engaging the flanged end of the sleeve 50 and the opposite end of the shaft 49 projecting from the lower end of the sleeve 50 is operatively connected to the drive shaft 20 through a pair of beveled pinions fixed to the shafts and meshing with each other, as shown at 52. The upper face of the disk 48 is arranged with a radial recess 53 extending past the center of the disk and the outer end terminating in a flat vertical face on the periphery of the disk extending transversely of the recess and adapted for the mounting of a plate, as shown at 54 in Figures 2, 4 and 6, said plate having an opening in the center thereof in alinement with the recess 53 for the rotatable mounting of a headed lead screw 55 having the threaded portion extending into the recess for the adjustable engagement of a screw threaded bore in the transverse head of a pintle 56 projecting vertically from the recess 53. The pintle 56 is operatively connected to the slide 42 through a crank arm 57 having bosses at the opposite ends, one boss being rotatably mounted on the pintle 56 and the other boss rotatable on a bearing screw threaded in the slide 42, as shown at 58 in Figure 4. The lead screw 55 is maintained in a horizontal position and the pintle 56 in a vertical position by gibs 59 fixed to the disk to extend over the longitudinal edges of the recess 53 and engage the transverse head of the pintle 56, as shown in Figure 6. The adjustment of the lead screw 55 will vary the length of travel of the slide 42 and the movement of the slide 42 toward the mandrel 31 will cause the dog 40 to grip the web W against the plate 44 and feed a length of web to the mandrel, the length of said fed web depending upon the adjustment of the lead screw 55. The retrograde movement of the slide 42 from the mandrel 31 will cause the dog 40 by the frictional engagement of the dog with the web to move from the web against the tension of the spring 45, and the web is held against movement during the retrograde movement of the dog 40 by a dog 60 similar in structure and yielding mounting to the dog 40 but fixedly mounted relative to the feeding movement of the web by having the mounting pin 43' thereof screw threaded in a leg portion of a bifurcated vertical extension 61 of cross member 62 fixed at the opposite ends to the support 35 at the opposite sides of the opening 47. The retrograde movement of the web will cause the dog 60 to impinge the web against an associated gripping plate 44' (Figure 6) similar to the plate 44 under the influence of a spring 45' similar to spring 45, and the feeding movement of the web will rock the dog 60 on its mounting pin 43' from its associated plate 44' against the tension of the spring 45'. The rocking movement of the dogs 40 and 60 against the force of the springs 45 and 45', respectively, is adjustably limited by set screws adjustably mounted in lateral lugs of the leg portions 41 and 61, respectively, as shown at 63 in Figure 6. The web W is fed through the space between the legs of the bifurcated extension 41 and 61.

After a predetermined length of web W is fed relative to the mandrel 31 by the movement of the dog 40 toward said mandrel, the forward section of said fed portion of web is severed and constituting a core forming blank to be folded around the mandrel to form a contractile and expansible tubular member normally assuming expanded position by positioning the rearward edge of said forward section relative to a fixed cutter comprising a blade portion 63' and a bifurcated portion 64 extending at a right angle from the blade portion and engaged by the head of a mounting bolt 65 supported in an opening passed through one of the standards 34 and secured therein by a nut screw threaded on the free end of the bolt projecting from the outer side of said standard, as shown at 66 in Figure 6. The cutter blade 63' is adjusted toward and away from the mandrel 31 by moving the bifurcated portion transversely of the bolt 65 and is retained in adjusted position by tightening the nut 66 onto the bolt and a set screw adjustably mounted in a perforated ear of the standard 34, as shown at 67 in Figure 4. The web W is guided to and yieldingly held against the cutter blade 63' by a guide opening 68 in the ear supporting the set screw 67 and a resilient finger 69 fixed at one end to the other standard 34 with the free end engaging the face of the web opposite the face engaged by the cutter blade 63', as shown in Figure 6. The predetermined length of web or core forming blank is severed by a movable cutter blade 70 moving toward and away from the face of the web engaged by the resilient finger 69 in cutting alinement with the fixed cutter blade 63', and simultaneously with the severing of the web by cutters 63', 70, the center section of the severed web portion or blank is wrapped around half of and clamped to the mandrel 31 by a forming member 71 of a pair of forming members. Said forming member 71 is in the form of a rectangular block having an arcuate recess 72 in one end edge conforming to the curvature of the mandrel 31 and a transverse opening 73 intermediate the ends for the adjustable mounting of the movable cutter blade 70 by a bolt having a head adapted to engage the outer face of the member 71 and the free end screw threaded into the cutter blade 70 to abut said blade against the inner face of the member 71, as shown at 74 in Figure 6. The cutting edge of the blade 70 may be adjusted toward or away from the arcuate recess 72 by loosening the bolt 74 and said blade is retained in adjusted position by a set screw adjustably mounted in an ear of the member 71 to abut the rear edge of the blade, as shown at 75 in Figure 6. The other bending and forming member 76 has a V shaped recess 77 in an end edge thereof with the base of the V of arcuate form corresponding to the curvature of the mandrel 31, and said member is slidably mounted in a slideway arranged on the outer face of the standard 34 supporting the bolt 65, as shown at 78, so that the member 76 will have movement transversely of the standard and position the V recess 77 to engage opposite diverging end portions of the recess with the parallelly extending opposite end sections of the severed portion of the web having the intermediate section clamped to and folded around the mandrel by the arcuate recess 72 of the member 71. The forming member 71 is slidably supported in the outer face of the standard 34 arranged with the resilient finger 69 by a slideway similar to the slideway 78 for the member 76. The members 71, 76 are actuated toward the mandrel, so that the predetermined length of web W is severed by the cutters 63', 70 and simultaneously the intermediate section of the severed portion of web is clamped to and folded around half of the mandrel 31 by the member 71 and subsequently the opposite end sections of the severed portion of web is bent around the remaining half of the mandrel with the longitudinal edges disposed in opposed and separated relation by the member 76. This is accomplished by a pair of cams, one cam 79 comprising an arcuate plate fixed to the lower face of the disk 48 and having a vertical flange spaced from the periphery of the disk, as shown in Figure 4, and adapted to engage a cam following roller 80 carried at the free end of an arm 81 integral with one end of a sleeve 82 rotatably mounted on an arbor fixed at one end in the table T, as shown at 83, and the opposite end of the sleeve 82 is arranged with a laterally extending arm 84 having the free end operatively connected to the member 71 by a link 85 pivoted at one end in a bifurcation in the end of the arm 84 and the opposite end of the link pivoted in a bifurcation in the end of the member 71 opposite the end arranged with the arcuate recess 72. The roller 80 is yieldingly urged into engagement with the cam 79 by a spring 86 compressed between the lever arm 81 and an abutment adjustably mounted on the table T, as shown at 87 in Figures 2 and 6. The other cam 88 comprises an annular member of angle shape in cross section mounted on the upper face and periphery of the disk 48, as shown in Figure 4, and a peripheral portion of said annular member projecting laterally to form the cam, as shown in Figures 2 and 6, adapted to be engaged by a cam following roller 89 carried by an arm 90 integral with the lower end of a sleeve 91 rotatable on a vertical arbor 92 fixed at the lower end on the table and the upper end of the arbor connected to the upper end of the arbor 83 by a cross member 93. The upper end of the sleeve 91 is arranged with an integral arm 94 having the free end pivotally connected to the end of the member 76 opposite the recessed end 77 by a link 95 in the same manner as link 85 connects arm 84 with the member 71. The roller 89 is yieldingly urged to engage the cam 88 by a spring which is similar to and mounted in the same manner as spring 86. The cams 79, 88 are arranged so that cam 79 will engage roller 80 and actuate forming member 71 to sever the web W and fold the intermediate section of the severed web portion around half of and hold it to the mandrel 31 before the cam 88 engages roller 89 and actuates forming member 76 to fold or bend the opposite end sections of the severed web portion around the remaining half of the mandrel with the opposite longitudinal edges disposed in opposed relation, as shown in Figures 2 and 6. The web W consists of ductile material having sufficient springiness so that the severed and folded web portion will assume a slightly expanded circular core form and adapted to be constricted after the members 71, 76 are actuated from the mandrel, as shown in Figure 17.

To facilitate the winding of a web of material, such as medicated tape, upon a core of a spool, the end of said web is anchored to said core by engaging said end in a depression $d$ in the core, said depression being shown in Figure 19. This depression $d$ is formed while the center section of the severed web portion is formed around half of the mandrel by a detenting member 96 having a pointed face and mounted in a corresponding recess in the center portion of the arcuate recess 72 of the forming member 71 with the pointed face projecting from the arcuate recess to engage the material of the severed web portion and offset it into a recess 97 in the mandrel 31 corresponding in shape to the projecting pointed face of the member 96 when the forming member 71 clamps the intermediate section of the severed web portion to the mandrel, as shown in Figure 7. The detenting member 96 will also hold the severed web portion against movement while the recess 77 of the other forming member 76 is engaging and wrapping the opposite end sections of the severed web portion around the mandrel, as shown in Figure 8.

It will be seen in Figure 17 that the formed core $c$ will expand slightly after the forming members 71, 76 are actuated from the mandrel 31 and said core will drop by the force of gravity from the mandrel. To assure the dropping of the core from the mandrel during the receding movement of the forming members, there is provided a stripping member comprising a shank portion 98 slidable in a slideway 99 formed in the edge of the plate 33 forward of the mandrel mounting 32, and the lower end of the shank arranged with a lateral bifurcation having the leg portions thereof extending on opposite sides of the mandrel, as shown at 100 in Figure 9. The stripping member is actuated by an arm 101 pivotally mounted at one end on a boss of a bracket fixed to and projecting from the upper face of the cross member 93, as shown at 102, and the opposite end of the arm bifurcated with the bifurcation legs slotted for the engagement of pins extending from the opposite sides of the shank portion 98 above the slideway 99, as shown at 103. The stripping member is yieldingly actuated to stripping position by a spring 104 fixed at the opposite ends to the lever 101 and a standard 34, and said stripping member is actuated to position the bifurcation legs 100 at an upper portion of the mandrel above the portion upon which the core $c$ is formed during the feeding of the web to the mandrel and the forming of the core upon the mandrel by a roller mounted in ears extended from the bifurcation legs of the extension 41 of the slide 42, as shown at 105, engaging a raised straight portion 106 of a stepped edge of a plate 107 fixed at the opposite edge to the arm 101 adjacent to its pivotal mounting 102. During the retrograde movements of the web feeding slide 42 and core forming members 71, 76, the roller 105 will ride off the raised portion 106 and onto a lower portion 108 permitting the stripping member to be actuated by the spring 104 to engage the bifurcation legs 100 with the completed core and remove the core from the mandrel 31, as shown in Figure 4.

The core $c$ drops directly from the mandrel 31 upon a horn of a series of horns and into engagement with an annular flange $f$ previously engaged on said horn. The horns are part of the means to assemble flanges on the opposite ends of the core and comprise a shank portion 109 projecting centrally from the upper face of a shoulder portion 110 arranged at the top of a tubular portion 111 having external screw threads at the free end and adapted to be engaged in an opening of a series of openings equidistantly spaced around the peripheral portion of a turret 112 having a cup shaped hub portion 113, as shown in Figures 4 and 5. The horns are fixed in the turret 112 by annular retaining members releasably engaged on the screw threaded end of the tubular horn portions 111 and arranged with sockets for the application of a pin wrench, as shown at 114, to tighten the retaining member upon the tubular portion 111 and draw the shoulder 110 against the upper face of the turret 112. Each horn is arranged with means to eject a spool assembled on the horn from said horn comprising an anular member 115 slidable on the shank portion 109 of the horn and yieldingly urged against the shoulder 110 by a spring 116 engaged in the bore of the tubular portion 111 and compressed between the end of said bore and a plate 117 carried at the ends of a plurality of rods 118 slidable in the tubular and shoulder portions of the horn and screw threaded in the annular member 115, as shown in Figure 5. The turret 112 is rotatably mounted on the table T by a shaft 119 rotatably supported in hub portions of a pair of plates 120, 121 supported by the table relative to an opening in said table in the form of two circles of different diameters and connected at the peripheries, as shown at 122 in Figure 3, and said opening having a vertical flange 123 depending from the table T. The plate 120 is fixed to the top of the table T over the largest circular portion of the opening 122, and the plate 121 abutting the flange to enclose the entire opening at the bottom and form with the plate 120 a casing 123' for a gear wheel 124 fixed on the portion of the shaft 119 passing through said casing. The hub 113 of the turret 112 is fixedly mounted on the end portion of the shaft 119 projecting above the plate 120 by a bearing sleeve engaged in the hub 113, a nut screw threaded on the shaft and abutting a washer against the center of the bearing sleeve, and a retaining ring bolted to the turret and having the inner peripheral portion overlapping the outer peripheral portion of the bearing sleeve, as shown at 125 in Figures 4 and 5. The shaft 119 and turret 112 are intermittently rotated in the direction indicated by the arrow in Figure 2 from the drive shaft 20, in a manner to be described hereinafter, to position the shank portions 109 of the horns to successive stations, such as in vertical alinement below the mandrel 31 to receive a core $c$ therefrom. The initial station, to which each horn is positioned, is provided with means to feed and place an annular flange $f$ onto a horn shank 109 and in engagement with its associated ejecting member 115, comprising a slideway 126 formed in the bifurcation legs of a bifurcated bracket 127 mounted on a side edge of the table T in horizontal alinement with the shaft 119 and a slide 128 slidable in the slideway and having a comparatively thin feeding portion 129 at the forward end. The slide 128 is retained in the slideway by a plate 130 fixed to the bracket 127 and having an elongated recess 131 to accommodate and permit reciprocation of the slide and an opening in alinement with the longitudinal axis of the recess 131 for the mounting of the lower end of a supply tube 132 adapted to receive and support annular flanges $f$ in stack formation and said tube having an elongated opening 133 to observe the quantity of flanges therein and permit straightening of said flanges. The upper end of the tube may be connected to a suitable hopper containing a supply of flanges but said hopper is not shown as it does not constitute a part of this invention. The forward end of the slideway 126 is arranged with a transverse portion forming a platform 134 in spaced relation below the plate 130 and the lower end of the tube 132 to receive the lowermost flange in the tube 132 and support the remaining flanges in stack formation and over which platform the feeding portion 129 of the slide 128 moves to engage and feed the lowermost flange from the tube 132 to a depressed pocket 135 arranged in said transverse portion in the path of travel of the horn shanks 109 and having a slot or opening 136 in the bottom thereof for the passage of the upper ends of the horn shanks into and through the pocket 135. The width of the slot is less than the width of the pocket to form shoulders to support and position the flange in the pocket in a horizontal plane and permit said flange to slide freely down the engaged horn shank into engagement with its associated annular member 115 when said shank moves from the pocket, and the wall of the slot nearest the shaft 119 extends in an arcuate direction to permit the free passage of the horn shanks through the pocket, as shown in Figure 2. The slide 128 is actuated to position a flange $f$ in the pocket 135, while a horn shank 109 is positioned in the pocket in horizontal alinement with the slide, from the drive shaft 20 by a suitably shaped cam face disk 137 fixed on said shaft to engage a roller 138 rotatably supported between a pair of spaced bars 139 having the opposite ends connected to rods 140, 140' slidable in bosses 141, 141' arranged in and extending upwardly from diametrically opposite portions of the plate 121, as shown in Figures 3 and 5, with the upper ends of the rods having pins extending laterally from diametrically opposite sides to engage slots in a bifurcated end of bell crank levers 142, 142', respectively, as shown at 143, 143', respectively. The roller 138 is yieldingly urged to engage the cam 137 by springs 144, 144' coiled around the rods 140, 140', respectively, and compressed between the bosses 141, 141', respectively, and the mountings of the rods at the ends of the bars 139. The lever 142 is pivotally supported between the bifurcation legs of the bracket 127, as at 145, and the free end of said lever is pivotally connected, as at 146, between and to a pair of ears depending from a plate 147 connected to the slide 128 and having a forwardly extending portion engaging the underface of the platform 134 to guide and prevent canting of the slide 128.

After a horn shank 109 is provided with an annular flange $f$, said shank is positioned to three intermediate stops of the intermittent movement of the turret 112 where no operations are performed, before said shank is positioned at a second operating station in alinement with the lower end of the mandrel 31 to receive a core $c$ which core will slide down the shank until its lower end engages the annular flange $f$ being supported by the annular member 115.

After a horn shank 109 is provided with an annular flange $f$ and a core $c$ having its lower end engaging said flange $f$, said shank is actuated by the turret 112 to three more intermediate stops where no operations are performed and then the shank is positioned at a third operating station where a second annular flange $f'$ is positioned on the horn shank 109 at the upper end of the core by mechanism comprising a slideway 126' arranged in a bracket 127' mounted on the table T in diametrical alinement with the bracket 127, a slide 128' slidable in the slideway 126' and actuated from the drive shaft 20 through the bars 139, rod 140' and lever 142' to engage a thin feeding portion 129' of the slide 128' with the lowermost annular flange of a stack of flanges $f'$ in a supply tube 132' and feed said flange from the tube 132' to a pocket 135' arranged below and forwardly of a platform 134' supporting the flanges $f'$ in the tube 132'. The structure and operation of the mechanism for feeding and positioning a flange $f'$ on a horn shank 109 in engagement with the upper end of a core on said shank is the same as the mechanism for feeding and positioning the first flange $f$ on the horn shank, and therefore a detail description of the second flange feeding mechanism is not deemed to be necessary and corresponding parts of said mechanisms are indicated by corresponding numerals primed. The flanges $f$, $f'$ are of the same construction and have an annular bead $b$ at the outer periphery and the inner periphery is arranged with a neck portion $n$ extending from the flange in the same direction as the bead $b$, as shown in Figure 18. The flanges $f$ are stacked in the tube 132 with the bead $b$ and neck $n$ facing in a downward direction, so that the lower end of the core will engage the flange $f$ at the juncture thereof with the neck $n$, and the flanges $f'$ are stacked in the tube 132' with the bead $b$ and neck $n$ uppermost, so that the upper end of the core will engage the flange $f'$ at the juncture thereof with the neck $n$.

After a core is arranged with flanges at the opposite ends on a horn shank, said horn shank is actuated to two more stops of the turret from the second flange feeding mechanism, and at the second of said stops, the flanges are moved onto the engaged ends of the core, as shown in Figure 18, by assembling means shown in Figures 10 to 12, inclusive, as comprising a pair of complementary members having arcuate faces 148 at one end and the opposite ends bifurcated, as at 149, and slidably mounted in a pair of angle members 150 depending from an end portion of a plate 151 fixed at the opposite end portion on the bracket 127' supporting tube 132' and having openings corresponding to the bifurcations 149 and the opening formed by the arcuate faces 148, as shown at 152 in Figures 10 and 11. The complementary members are yieldingly urged toward each other to engage the arcuate faces 148 with diametrically opposite portions of and contract the core on the horn positioned at the assembling station by springs fixed at the opposite ends to plates mounted on bifurcated ends 149 of the complementary members, as shown at 153, and the arcuate faces are actuated from each other against the force of said springs during the movement of the turret 112 by a pair of cam members extending through the end openings 152 of the plate 151 and the bifurcations 149 and comprising a base portion 154 of uniform thickness, an intermediate portion 155 having the outer face diverging from the base portion to an outer end portion 156 of uniform thickness but of greater thickness than the base portion 154. The base portion 154 is mounted on the underface of a laterally extending arm 157 of a channel shaped slide 158 slidably mounted on a post 159 fixed at the lower end in a mounting bracket 160 fixed on the table T. During the rotation of the turret 112, the slide 158 is moved upwardly to engage the diverging face 155 with a roller 161 rotatable in each of the bifurcations 149, which engagement will move the arcuate faces 148 from each other and the continued upward movement of the slide will engage the end portions 156 with the rollers 161 and space the arcuate faces 148 a sufficient distance apart to permit positioning of a horn shank 109 between said faces, as shown in Figure 11. The slide 158 is reciprocated from the drive shaft 20 through a rock shaft 162 rotatably mounted in the leg portions of a U shaped bracket 163 mounted on the base B of the framework and said shaft is rocked by a cam face disk 164 fixed on the drive shaft 20 and adapted to engage a roller 165 carried at the end of an arm 166 fixed on one end of the rock shaft and the opposite end of the rock shaft is connected to the slide 158 through an arm 167 fixed to said end of the rock shaft and a pair of links 168 pivotally connected at one end to opposite sides of the arm 167 and at opposite ends pivotally connected to another pair of links 168' pivotally connected to the opposite sides of an ear 169 extending downwardly from the slide 158. The roller 165 is yieldingly engaged with the cam disk 164 by a spring 170 connected at one end to the free end of the arm 167 and the opposite end anchored to the bottom of the table T. The cam 164 is arranged to actuate the slide 158 to its highest position when the turret 112 is moving, as shown in Figure 11, and during the period of rest of the turret, the cam actuates the slide to its lowermost position shown in Figure 10 to permit the arcuate faces 148 under the influence of the springs 153 to engage and constrict the core on the horn shank. While the core is in constricted condition, the spool flanges f, f' are moved onto the engaged ends of the core by a plunger 171 slidably mounted in a boss in the lateral slide arm 157 in vertical alinement with the center opening 152 in the plate 151 and retained therein by nuts screw threaded on the upper end of the plunger 171 projecting above the arm 157, as shown at 172, and the lower end of the plunger is arranged with a hollow head having an annular recess in the inner wall at the mouth of the head, as shown at 173 in Figure 10, to permit the head to engage and move the flange f' onto the core c until the inner horizontal wall of the recess 173 engages the upper end of the core and moves the lower end portion of the core into the neck n of the flange f. The head of the plunger 171 is yieldingly urged from the slide arm 157 by a spring 174 engaged on the plunger and compressed between the lateral slide arm 157 and the plunger head, to a position to engage the flange f' while the cam portions 154 are engaging the rollers 161, as shown in Figure 10. In the lowermost position of the slide 158, the lower end of the core c will extend beyond the neck n of the flange f into an annular recess 175 in the upper face of the annular members 115 encircling the opening therein, and any further downward movement of the slide 158 will cause the plunger 171 to move in an upward direction against the force of the spring 174. The tension of the springs 153 upon the arcuate faces 148 is such to permit longitudinal movement of the core along said faces by the plunger head after the flange f' is fully assembled on the upper end of the core. The plunger 171 during the downward movement of the slide 158 will pass through the center opening 152 of the plate 151 before engaging the head thereof with the flange f'.

After the arcuate faces 148 and the plunger 171 are simultaneously moved from the horn at said assembling station, the flanges f, f' are held on the core under the expansion force of the opposite side edge portions of the core to assume the open position shown in Figure 17, and the horn having the assembled core and spools thereon is positioned to two more additional stops by the intermittent rotation of the turret 112. At the second of these stops, the core with the flanges assembled on the opposite ends thereof is removed from the horn shank 109 by moving the annular member 115 up its associated horn shank to position the spool flange f above said horn shank. This movement of the annular member is effected by a reciprocating head comprising a cross bar 175' fixed at the opposite end portions to the upper ends of a pair of rods 176 slidable in the table T and having the lower ends connected by a bar 177. (Figures 4 and 5.) The reciprocating head is actuated to engage the cross bar 175' with a block 178 fixed to the bottom face of each of the plates 117 associated with the annular ejecting members 115 and move said member to the end of the horn during the period of rest of the turret 112 by the downward movement of the slide 158 by connecting said cross bar to the links 168 through a lever 179 pivoted intermediate its ends on a bracket 180 mounted on the plate 120 and the lever having one end pivotally connected to the connection between the links 168, 168', as at 181, and the opposite end of the lever 179 being slotted to engage a pin fixed in and extending laterally from the cross bar 175', as shown at 182 in Figure 13. The length of the rods 118 and the movement of the lever 179 are sufficient to position the recessed face of the ejecting annular member 115 above the upper end of the horn shank 109 and completely remove the assembled core and flanges from the horn shank.

The purpose of the ejector mechanism 115, 175' is to transfer the assembled core and flanges from the horn shanks 109 onto conveying means of mechanism for securing the opposite ends of the core to the flanges to produce a complete spool and discharge said complete spool from the apparatus. The conveying means comprises a second turret 183 having a cup shaped hub secured to the upper end of a shaft 184 rotatably supported in an elongated sleeve 185 having a flange 186 at the lower end adapted to cover the smallest circular portion of the opening 122 in the table T and secured to said table, and the lower end of the shaft 184 being supported by a boss in the plate 121, as shown at 187 in Figure 4. The turret 183 is secured to the shaft 184 in the same manner as turret 112 is secured to the shaft 119 as hereinbefore described and indicated at 188 in the present instance. The turret 183 is arranged with a series of equidistantly spaced openings around the periphery thereof for the mounting of tubular members 189 having an intermediate bore portion of smaller diameter than the diameters of the opposite end bore portions for engaging the head of a screw 190 releasably engaged in a bore of a reduced end 191 of a horn 192 having an intermediate enlarged portion 193 to limit the engagement of the reduced end 191 in the lower end bore portion of the tubular member 189, as shown in Figure 4. The shoulder formed between the horn 192 and enlarged portion 193 is arranged with an annular recess 247, as shown in Figure 16. The tubular members 189 are secured in the openings in the turret 183 by nuts 194, similar to the nuts 114, screw threaded on the opposite ends of said members projecting from the opposite faces of the turret and the nuts 194 are retained in securing position on the tubular members by channel shaped clamping members 195 secured to the periphery of the turret relative to each sleeve member by a screw 196 engaged in an opening in an intermediate portion of the clamping members and screw threaded into the turret with the opposite ends of the clamping members abutting the periphery of the nuts. Each of the horns 192 is arranged with a stripper comprising a sleeve member 197 slidable on the intermediate enlarged horn portion 193 and yieldingly urged toward the free end of the horn 192 by springs engaged in a recess in the sleeve and abutting the lower end of the tubular member 189, as shown at 198 in Figure 16, and said downward movement of the stripper sleeve is limited by a rod fixed at one end in the sleeve 197 and having limited sliding movement in the tubular member 189, as shown at 199 in Figure 16, to position the lower end of the sleeve adjacent to the recess 247 in the horn 192. The horns 192 are spaced from each other the same distance as the horns 109 are spaced from each other, so that a horn 192 may be positioned in vertical alinement above a horn 109 stationed at the reciprocating head 175' for the actuation of the stripping member 115 to transfer an assembled core and flanges from the horn 109 to the alined horn 192. The turret 183 is intermittently rotated in synchronism with the intermittent rotation of the turret 112 by a Geneva mechanism comprising a wheel 200 keyed to the shaft 184 within the casing 123' formed by the plates 120, 121, 186 and flange 123 and in abutting relation with the boss 187 in the plate 121 and arranged with recesses 201 equidistantly spaced about the periphery and extended radially inward with the portions of the periphery of the wheel 200 between the recesses being of curved or convex form, as shown at 202 in Figure 3. The wheel 200 is intermittently actuated from the drive shaft 20 by a pair of pins 203 adapted to engage the recesses 201 and fixed in and projecting from diametrically opposite portions of the upper face of a disk 204 fixed on the upper end of a shaft 205 rotatably mounted in an elongated boss 206 integral with and extending from the lower face of the plate 121 with the lower end of the shaft 205 projecting from the boss 206 and operatively connected to the drive shaft 20 through meshing beveled pinions 207 fixed to said shafts, as shown in Figures 3 and 4. The continuous rotation of the shaft 205 is converted into intermittent rotation of the shaft 184 by the pins 203 successively engaging the recesses 201 in the wheel 200. The intermittent rotation of the shaft 184 is imparted to the shaft 119 by a gear 208 fixed on the shaft 184 above the wheel 200 and meshing with the gear wheel 124. In the present embodiment of the invention, there are sixteen horns 109 on the turret 112 and eight horns 192 on the turret 183, so that the circumference of the turret 183 is half of the circumference of the turret 112. The recesses 201 in the wheel 200 are eight in number and spaced apart so that a half of a revolution of the disk 204 will move the turrets 112 and 183 a distance to position the horns 109, 192 in vertical alinement with each other at the ejecting station of the turret 112. The shaft 184 is held against rotation while the pins 203 are disengaged from the recesses 201 and during the rest periods of the turrets 112, 183 by a block 209 fixed to the disk 204 and having diametrically opposed arcuate faces midway between the pins 203 to engage the concave peripheral portions 202 of the wheel 200. After the reciprocating head 175' transfers the assembled core and spools from the horn 109 to the alined horn 192, the turrets 112, 182 are actuated to move the alined horns from each other, the horn 109 being empty and moving toward the means to feed and place a flange $f$ thereon to commence the assembling of another pair of flanges on a core, and the horn 192 having an assembled core and flanges thereon is moved relative to a rail 210 mounted to extend partially around the shaft 184 and below the horns 192 to engage the flange $f$ when said flange is moved from the ejecting member 115 of the turret 112, and the forward end of the rail is beveled and bifurcated, as at 211, to permit the travel of said ejecting member from said ejecting station when the turret 112 is actuated, as shown in Figure 13. The ejecting movement of the annular member 115 is sufficient to engage the upper end of the core into the recess 247 which engagement together with the receding ejecting member 115 will retain the assembled core and flanges on the horn 192 until the flange $f$ engages the rail 210.

The turret 183 is intermittently actuated to position the horns 192 to three successive stops from the station at which the assembled core and flanges are transferred to said horns, and at the fourth successive stop, which will be diametrically opposite to the transferring station, the ends of the core and the necks $n$ of the flanges $f$ and $f'$ are crimped to each other, as shown at $k$ in Figure 19. The rail 210 will extend from the transferring station to the crimping station to prevent the dropping of the assembled spools from the horns 192. The means to perform this crimping operation comprises, as shown in Figures 14 and 15, a pair of jaw members having complementary arcuate faces 212 at one end and an opening 213 extending through said members adjacent the opposite ends and parallelly of the faces 212 and said jaw members are yieldingly mounted on a pair of nesting slides 214, 215 to have movement vertically of the slides by slidably mounting the jaw members on spaced alined posts fixed in and projecting from the opposite longitudinal edge portions of said slides to engage recesses in the opposite sides of the jaw members, as shown at 216 in Figure 14. The jaw members are yieldingly retained on the slides by springs 217 engaged in the openings 213 in the jaw members having one end fixed to a pin 218 fixed at the opposite ends in diametrically opposite portions of the openings at the upper end thereof and the opposite ends of the springs fixed to a pin extending transversely of and fixed in an opening in the slides, as shown at 219 in Figures 15 and 16. The slide 214 is of U shape in plan view with posts 216 and opening 219 in the connecting end portion and the slide 215 is of rectangular shape slidable between the leg portions of the slide 214, as shown in Figure 14. The slides 214, 215 are slidable on a horizontal channeled shelf 220 mounted on a bifurcated support 221 fixed to the top of table T at the end thereof opposite the end supporting the shaft 49, and the slides are retained in the channel of the shelf by gibs fixed to the vertical walls of the channel and having the rear end portions of greater width to extend over the longitudinal edge portions of the slide 215, as at 222, and the forward end portions of less width to accommodate the posts 216 and the jaws, as at 223. The jaw faces 212 are yieldingly urged toward each other to engage diametrically opposite portions of the core c on the horn 192 positioned between said jaws by a pair of springs 224 fixed at one end to reduced ends 225 of a rod 226 mounted in ears 227 fixed to and projecting from the leg portions of the slide 214 with the reduced ends 225 extending from the outer sides of the ears and the rod extending transversely above the slide 215, and the opposite ends of the springs 224 are fixed to reduced ends 228 of a rod 229 mounted in ears 230 fixed to and extending upwardly from the opposite longitudinal portions of the slide 215 with the rod 229 extending transversely of the slides. To assure the clamping of the jaws against the core with sufficient force, the slides 214 and 215 are further urged in opposite directions by a spring 231 coiled around a rod 232 fixed at one end on a cross member 233 mounted at the opposite ends on the tops of the ears 227 and the rod extending through an opening in an abutment plate 234 fixed to the ears 230, the spring being compressed on the rod between the abutment plate 234 and a washer held on the free end of the rod, as at 235, whereby the ears 227 and 230 and consequently the jaws are urged toward each other. The curling or crimping action is performed by a die member comprising a shank portion 236 having an annular recess 237 at one end formed by a nipple portion adapted to engage a correspondingly recessed portion in the end of each of the horns 192, as shown at 238 in Figure 16, and the opposite end of the shank portion is integral with and extended centrally from an enlarged portion 239 externally screw threaded above a further enlarged shoulder 240 separating said enlarged portion 239 from a base portion 241 secured to a lateral projection of a slide 242 slidably mounted in a slideway 243 formed in the outer face of the connecting portion of the support 221. The base portion 241 of the die member is secured to the lateral extension of the slide 242 by a bolt engaged in an opening in the extension and screw threaded into the base portion, as shown at 244 in Figure 15, and the engagement between said bolt and base portion is retained by a pair of nuts screw threaded on the exterior of the base portion with the lower nut having an enlarged end portion abutting the slide extension, as shown at 245. The upward stroke of the slide 242 will engage the recess 237 with the lower end of the core c and the neck n of the flange f and the continued upward movement of the die shank 236 will curl said lower end of the core and neck into a corresponding recess 246 in the lower end of the jaw faces 212 and move the core and the jaw members upwardly against the force of the springs 217 to position the upper end of the core and the neck n of the flange f' into engagement with the annular recess 247 in the horn 192, which recess 247 in conjunction with a recess 248 in the upper end of the jaw faces 212 will curl the upper end of the core with the neck of the flange f', as shown in Figure 16. The reciprocation of the die member toward and away from the horn 192 positioned between the jaw members will actuate said jaw members from each other against the force of the springs 224 and 231, so that when the die member is actuated by the slide 242 from the horn 192 after the ends of the core are curled with the necks n of the flanges f, f', the jaw members will be positioned from each other with the jaw faces 212 spaced from each other to permit the travel of the horn having a completed spool thereon from the crimping mechanism and the positioning of a succeeding horn having an assembled core and spools thereon between the jaw members preparatory to the crimping of the spools to the core. This is accomplished by a pair of arms having straight portions 249 and obliquely extending portions 250 arranged at one end with bosses rotatably mounted on an arbor 251 fixed at the opposite ends in the bifurcation legs of the support 221, and the inner or opposed edges of the straight arm portions 249 are arranged with corresponding faces having a low portion 252 at the free end of said arm portions and a high portion 253 adjacent the oblique portions 250. The free ends of the arm portions 249 are bifurcated for engagement with reduced flat face portions midway the ends of the rods 226 and 229, as shown at 254, and the free end of the arms 249, 250 are yieldingly urged in a direction toward each other by the springs 224, 231 to position the faces 252, 253 relative to a roller 255 rotatably carried between the leg portions of a bifurcated extension 256 integral with and extending laterally from the upper end of the slide 242, whereby the positioning of the die member 236 from the shelf 220 by the slide 242 will engage the roller with the arm faces 253 and position the jaw faces 212 a distance from each other to permit moving the horns 192 from between said jaws, as shown in Figures 14 and 15, and the approach of the die member to crimping position will move the roller 255 from between the faces 253 relative to the arm faces 252 which will permit the springs 224, 231 to actuate the jaw faces 212 into yielding clamping engagement with the core c on the horn 192 positioned between said jaw faces, the engagement of the jaw faces with the core will position the arm faces 252 out of engagement with the roller 255, as shown in Figure 16. The slideway 243 is arranged with wear plates 257 adjustably positioned against the sides of the slide 242 by set screws 258 adjustably mounted in the sides of the slideway, as shown in Figure 3. The slide 242 is reciprocated to engage the die member 236 with the lower end of the core and the neck n of the flange f during the rest period of the turrets 112 and 183 from the drive shaft 20 through crank mechanism comprising a pin 259 fixed in and projecting from the cam 164 eccentrically of the drive shaft 20, and a crank arm 260 having bosses at the ends, one boss loosely retained on the pin 259 and the other boss loosely retained on a pin 261 fixed in and projecting from the lower end of the slide 242, as shown in Figure 4. The slideway platform 220 is arranged with an opening 220' to permit movement of the die member toward the jaws.

After the curls *k* are formed, the lower curl is removed from the recess 237 in the die member 236 by stripping means carried by said die member and comprising a sleeve member 262 slidable on the die shank 236 and having an annular shoulder 263 intermediate the ends thereof for the engagement of the underface of an inwardly extending annular flange at one end of a tubular retaining member 264 having the opposite end of enlarged diameter and internally screw threaded for adjustable engagement with the screw threads on the enlarged portion 239 of the die member whereby the ejecting movement of the stripper may be adjusted. The stripping member 262 is yieldingly actuated to remove the lower curl from recess 237 by a coil spring 265 mounted in the tubular member 264 and compressed between the enlarged portion 239 of the die member and the shoulder 263 of the stripping member, as shown in Figures 15 and 16. The upper curl *k* is removed or loosened from the recess 247 in the horn 192 by the stripper 197 under the force of the springs 198.

After the curls *k* have been formed and the jaws and the die member 236 removed from horn 192 carrying the completed spool *s*, said horn 192 is positioned over a tapering discharge chute 266 mounted on the table T with the wide end higher than the narrow end and positioned below the horn after it leaves the slideway 220, as shown in Figures 2 and 14, and the narrow end extending beyond the table to deposit the spools into a suitable depository or onto a conveyer travelling relative to the table. The completed spool will normally drop from the horn as soon as it leaves the slideway 220, but to assure the removal of the spool from the horn before said horn reaches the ejecting station of turret 112, there is provided stripping mechanism for this purpose comprising an arm 267 integral with a plate 268 having elongated openings therein for adjustably mounting the arm 267 on the side of the slide 158, as shown at 269 in Figure 13, and a spool engaging member 270 of U shape mounted on a downwardly extending end of the arm 267 and having slots 271 in the leg portions of said member extending from the upper edge into the leg portions. The arm 267 extends from the slide 158 to position the leg portions of the member 270 on opposite sides of the spool engaged on a horn 192 stationed at the second stop of said horn from the crimping station thereof, as shown in Figure 2, and while the turret 182 is at rest, the slide 158 will actuate member 270 in a downward direction from the horn 192 to the chute 266 and strip the spool from said horn if said spool has not previously dropped from the horn.

The driving mechanism mounted below the table T is enclosed by panels 272 supported in the space between the table T, base B and standards S. as shown in Figure 1, and the space between the turret 112 and the table T is also enclosed by a panel 273.

Having thus described my invention, I claim:

1. In spool making apparatus, a vertical support, an intermittently operative carrier for and adapted to move the support in a circular path and position the support at successive stations, means to engage an annular flange on the support at the initial station thereof, a fixed vertical mandrel disposed in a plane above the movement of the support and with which the support is adapted to be alined at a successive station, means to sever a blank from a web and clamp the blank to and bend the blank around the mandrel to form a contractile and expansible tubular spool core, and said core adapted by the release of the bending means therefrom to move from the mandrel onto the support above the flange engaged thereon, means to engage a second annular flange on the support above the core at a successive station of the support, means relative to which the support with the flanges and core engaged thereon is stationed operative to constrict the core on the support and engage the flanges on the opposite ends of the constricted core, and said core by the release of the constricting means therefrom adapted to expand and frictionally retain the flanges on the core, a second vertical support, an intermittently operative carrier for said second support adapted to move the second support in a circular path in a plane above the plane of movement of the first support, and said first support when moved to a successive station positioned in alinement with said second support, means operative in said position of the supports to transfer the core with the flanges engaged thereon from the first support to the second support, means to retain the core with the flanges on the second support as it is moved to a successive station, and means operative at said station of the second support to crimp the opposite end portions of the core to the material about the opening in and secure the flanges to the core.

2. In spool making apparatus, a vertical support, means to intermittently actuate the support in a horizontal circular path and position the support at successive stations, means to engage an annular flange on the support at its initial station, a vertical mandrel fixedly supported in a plane above the plane of movement of the support and relative to which the support is successively stationed, means to bend a blank around said mandrel to form a tubular contractile and expansible spool core, and said core when the bending means is released therefrom adapted to move from the mandrel onto the support above the flange engaged thereon, means at a successive station of the support operative to engage a second annular flange onto the support above the core, means relative to which the support with the flanges and core engaged thereon is successively stationed to constrict the core on the support and engage the flanges on the opposite ends of the constricted core and the core by the release of the constricting means adapted to expand and frictionally retain the flanges on the core, means to interlock the portions at the opposite ends of the core with the material about the opening in the flanges and secure the flanges to the core to form a spool and discharge the formed spool from said means, and means to transfer the core with the flanges engaged thereon from the support to said means to secure the flanges to the core.

3. Spool making apparatus as claimed in claim 1, wherein the means to transfer the core with the flanges engaged thereon from the support, comprises an annular member slidable on the first support and yieldingly urged to predetermined position on the support to be disposed below the core with the flanges engaged thereon, and means operative when the core constricting means is released from the core to actuate said annular member upwardly on said support and transfer the core with the flanges engaged thereon onto the second support.

4. In apparatus for making spools, a turret rotatable in a horizontal plane, a series of horns equidistantly spaced about and projecting vertically upward from said turret, means to intermittently rotate the turret to position the successive horns relative to stations successively positioned relative to the movement of the horns, stripping means on each horn slidably mounted in the turret relative to the horns to have movement from the turret to the free end of the horns and yieldingly urged to position to engage the turret at the base of the horns, means to engage an annular flange on the horns in abutting relation to the stripping means at the initial station of the horns, a mandrel supported in fixed vertical position above the path of movement of the horns and relative to which the successive horns are stationed by the movement of the turret, means to clamp a blank to and bend the blank about the mandrel to form a contractile and expansible spool core, and said core by the release of the clamping and bending means adapted to move from the mandrel onto the horn above the flange thereon stationed relative to the mandrel, means relative to which the horns are successively stationed to engage a second flange on the horn above the core, means relative to which the horns are successively stationed to constrict the core on a horn and engage the flanges upon the ends of the constricted core, and means relative to which the horns are successively stationed operative to actuate the stripping means toward the free end of the horns to transfer the core with the flanges engaged thereon from the horns.

5. Apparatus for making spools as claimed in claim 4, wherein the stripping means comprise rods slidably mounted in the turret about each horn with the opposite ends of the rods projecting from opposite faces of the turret, an annular member fixed on one end of the rods and slidably engaged on each horn and engaged by the first flange engaged on the horns, a plate fixed on the opposite ends of the rods and a spring yieldingly urging the plate from the turret and the annular member against the base of the horn at the turret, and the means to actuate the stripping means slidably mounted below the plates of the stripping means to have movement toward and away from the plates and adapted to engage a plate and move the annular member associated with said plate toward the free end of the horn against the force of the spring to remove the core having the flanges engaged on the opposite end portions thereof from the horn.

6. In apparatus for making spools, a turret rotatable in a horizontal plane, a series of horns equidistantly spaced about and projecting vertically upward from said turret, means to intermittently rotate the turret to position the successive horns relative to stations successively positioned relative to the movement of the horns, stripping means on each horn slidably mounted in the turret relative to the horn to have movement from the turret to the free end of the horns and yieldingly urged to position to engage the turret at the base of the horns, means to engage an annular flange on the horns in abutting relation to the stripping means at the initial station of the horns, a mandrel supported in fixed vertical position above the path of movement of the horns and relative to which the successive horns are stationed by the movement of the turret, means to clamp a blank to and bend the blank about the mandrel to form a contractile and expansible spool core, and said core by the release of the clamping and bending means adapted to move from the mandrel onto the horn above the flange thereon stationed relative to the mandrel, means relative to which the horns are successively stationed to engage a second flange on the horn above the core, means relative to which the horns are successively stationed to constrict the core on a horn and engage the flanges upon the ends of the constricted core, a second turret rotatable in a horizontal plane above the plane of rotation of the first turret, horns spaced about and carried by said second turret to extend vertically downward therefrom, means to intermittently actuate said second turret and successively position the horns in vertical alinement with successive horns of the first turret at a station successive to the station at which the spool core is constricted and the flanges engaged thereon, means to transfer the constricted core with the flanges engaged thereon from the horns of the first turret to the horns of the second turret, means relative to which the core with the flanges engaged thereon on the horns of the second turret are stationed to interlock the end portions of the core with the wall about the opening in the flanges to form the spool, and means relative to which the spool on said horns is stationed operative to arrange the core with a hook portion adapted to be engaged by a web to be wound upon the spool.

7. Apparatus for making spools as claimed in claim 6, wherein the means to constrict the spool core and engage the flanges upon the opposite end portions of the constricted core of the horns comprises an annular member of the stripping means slidable on the horns and normally positioned to engage the turret at the base of the horns and engaged by the first spool flange engaged upon the horns, a pair of members slidably mounted to have movement toward and away from each other and diametrically opposite portions of a horn stationed relative to said means and having arcuate faces in the opposed ends to engage diametrically opposite portions of and constrict the core on the horns, a plunger slidably mounted to have reciprocatory movement toward and away from the free end of the horns to engage the second flange and cooperate with the annular member of the stripping means to engage the flanges on the opposite ends of the constricted core and operative by the movement of the plunger to actuate the pair of slidable members to engage the arcuate faces with and constrict the core prior to engaging the flanges on the opposite ends thereof.

8. Apparatus for making spools as claimed in claim 6, wherein the means to constrict the spool core and engage the spool flanges upon the opposite end portions of the constricted core of the horns, comprises an annular member of the stripping means slidable on the horns and normally positioned to engage the turret at the base of the horns and supporting the first spool flange engaged upon the horns, and a pair of members slidably mounted to have movement toward and away from each other and engage diametrically opposite portions of a horn stationed relative to said means and having arcuate faces in the opposed ends to engage diametrically opposite portions of and constrict the core on the horn, a spring to yieldingly urge said slidable members toward each other, a plunger slidably mounted to have reciprocatory movement toward and away from the free end of the horns to engage the second flange thereon and cooperate with the annular member of the stripping means to engage the flanges on opposite ends of the constricted core, members extending parallelly of and participating in the movement of the plunger arranged with cam faces adapted to be engaged by rollers carried by and actuate the slidable members away from each other against the influence of the spring and permit said slidable members to be actuated by the spring to engage the arcuate faces thereof with and constrict the core on the horn during the initial movement of the plunger to engage the second flange upon the core and actuate the slidable members from the core on the horn during the retrograde movement of the plunger.

9. In apparatus for making spools, a turret rotatable in a horizontal plane, and series of horns equidistantly spaced about and extending vertically upward from the turret, means to intermittently rotate the turret to position the horns at successive stations, means to engage an annular spool flange on the successive horns at the initial station thereof, means to deliver a contractile and expansible core on the horns above said flange at a successive station of the horns, means to engage a second annular spool flange on the successive horns above the core at a successive station of the horns, means to constrict the core and engage the flanges on the opposite ends of the core on the horns at a successive station and said core by the release of the core constricting means adapted to expand and frictionally retain the flanges on the core, a second turret rotatable in a horizontal plane above the plane of rotation of the first turret, a second series of horns equidistantly spaced about and extending vertically downward from said second horn, means to intermittently rotate said second turret to successively position the horns carried thereby in vertical alinement with the horns carried by the first turret having thereon a core with flanges engaged upon the ends thereof, means operative in said position of the turret horns to transfer the core with the flanges engaged thereon from a horn of the first turret to a horn of the second turret, means relative to which the horn of the second turret to which a core having flanges engaged upon the ends thereof are successively stationed operative to crimp the opposite end portions of the core to the wall about the opening in the annular flanges and secure said flanges to the core to form a spool, means to retain on the horns of the second turret a core with flanges engaged thereon transferred to said horn as it is moved from the transferring station to the crimping station, and means relative to which the horns of the second turret with a spool thereon is successively stationed operative from the means to transfer the core with the flanges engaged on the ends thereof from a horn of the first turret to a horn of the second turret to eject the spools from the horns of the second turret.

10. Apparatus for making spools as claimed in claim 9, wherein the means to crimp the opposite end portions of the core to the wall about the opening in the annular flanges and form a spool comprises a pair of reciprocatory slides carrying jaws to participate in the movement of the slides and have movement perpendicular to the slides and yieldingly urged toward the slides, said jaws having arcuate faces in the opposed ends corresponding to the curvature of the spool core with recesses in the opposite ends of said arcuate faces, springs to yieldingly urge the slides in a direction to engage the arcuate faces of the jaws with diametrically opposite portions of a core on a horn of the second series of horns positioned between the jaws, a die member reciprocatory toward and away from the end of the horn engaged between the jaws to cooperate with said horn and the recesses at the ends of the arcuate faces in the jaws to crimp the opposite ends of the core to the flanges, and means connected to the slides operative by the reciprocation of the die member to permit engagement of the jaws by the springs with the core on the horn prior to the operation of the crimping means and in successive sequence actuate the slides to move the jaws from the core and impart retrograde movement to the die subsequent to said crimping operation.

11. Apparatus for making spools as claimed in claim 9, wherein the second series of horns have a reduced portion at one end arranged with a recess in a juncture of said reduced portion with the body of the horns, and the means to crimp the ends of the core to the flanges comprises a pair of slides slidably mounted in nested relation with each other, jaws mounted on the slides and arranged in opposed relation to each other to engage diametrically opposite portions of a core on a horn of the second series of horns engaged between the jaws, means to yieldingly urge the slides in opposite directions and engage the jaws with the core on the horn, a die member reciprocatory toward and away from the horn with a core thereon engaged between the jaws to cooperate with said horn to crimp the opposite ends of the core to the flanges, and means connected to the slides operative during the initial movement of the die member toward the horn to permit yielding engagement of the jaws with the core prior to the crimping operation and actuate the jaws from the core by the retrograde movement of the die member subsequent to said crimping operation.

12. In apparatus for making spools, a rotatable turret, horns equidistantly spaced about and projecting from the turret, means to intermittently actuate the turret to successively station the horns relative to means to engage a spool flange on the horns, deliver a contractile and expansible core onto the horns above said flange, engage a second flange on the horns above the core, and constricting the core on the horns and engage the flanges on the opposite ends of the constricted core, a second turret, horns equidistantly spaced about and projecting from said turret, means to intermittently rotate said turret and successively position the horns carried thereby relative to successive horns of the first turret having thereon a core with flanges engaged on the opposite ends, and said second horns arranged with an annular arcuate recess intermediate the ends thereof, means to transfer the core with the flanges engaged thereon from a horn of the first turret to a horn of the second turret, a pair of nested slides having jaws mounted thereon in opposed relation to each other at a station successive to the transferring station and between which jaws a horn of the second turret is engaged having a core with flanges engaged on the ends thereof, yielding means connecting the slides and normally urging the slides to engage the jaws with diametrically opposite portions of a spool core on a horn positioned between the jaws, a slide reciprocatory in a plane transversely of the plane of reciprocation of the nested slides, a die member carried by said slide and arranged to engage the outer end of the horn and core on the horn between the jaws and cooperate with the annular recess in the horn and the jaws to crimp the opposite ends of the core to the flanges by the movement of the die toward the jaws, a pair of arms pivotally supported at one end and the opposite end of each arm connected to a slide of the pair of slides and the opposed sides of the arms arranged with cam faces, and a roller carried by the die carrying slide disposed between the arms adapted to engage the cam faces of and actuate said arms to position the jaws away from the spool core on the horn between the jaws by the movement of the die carrying slide away from the pair of slides and be moved out of engagement with said cam faces when the die member is moved toward the horn to permit the yielding means to move the jaws into engagement with the core on the horn.

13. Apparatus for making spools as claimed in claim 12, wherein the jaws are slidably supported on the pair of slides to have movement transversely of said pair of slides and yieldingly urged toward said slides to permit longitudinal movement of the core during the crimping operation.

14. Apparatus for making spools as claimed in claim 12, wherein the jaws comprise blocks having arcuate faces corresponding to the curvature of the core, alined recesses in the opposite sides of each block and openings through said blocks, a pair of spaced posts fixed in and extending from each silde of the pair of slides to engage the alined recesses in the blocks and slidably support the blocks on the slides, and a spring positioned in the opening of each jaw block and having one end connected to said block and the other end connected to the associated slide to yieldingly urge the blocks toward the slides.

15. Apparatus for making spools as claimed in claim 12, wherein the jaws are arranged with recesses in the top and bottom thereof with the recesses in the horn and the die member are adapted to cooperate to crimp the opposite ends of the core to the flanges.

16. In apparatus for making spools as claimed in claim 12, means slidably mounted on each horn of the second turret and yieldingly urged to abut the flange on the inner end of the core of a spool on the horns and operative to strip the spool from the horn subsequent to the crimping operation.

17. In apparatus for making spools as claimed in claim 12, a sleeve member having a shoulder intermediate the ends and slidable on the die member, a housing fixed to and encircling the die member in spaced relation to a portion thereof and having a flange to engage the shoulder of the sleeve member and retain said sleeve member on the die member, and a spring mounted in the housing between the die member and the shoulder of the sleeve member operative to urge said sleeve member into engagement with the outer flange of a spool on a horn during the crimping operation and actuate said sleeve member to strip the spool from the die member during the movement of said die member from the horn.

JOHN A. JOHNSON.